(12) United States Patent
Kawaguchi

(10) Patent No.: US 7,092,171 B2
(45) Date of Patent: Aug. 15, 2006

(54) LENS BARREL WITH LOCK MECHANISM

(75) Inventor: Koji Kawaguchi, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 11/137,579

(22) Filed: May 26, 2005

(65) Prior Publication Data

US 2006/0072214 A1  Apr. 6, 2006

(30) Foreign Application Priority Data

Oct. 6, 2004  (JP)  ............................ 2004-293659

(51) Int. Cl.
  *G02B 15/15*  (2006.01)
  *G02B 7/02*  (2006.01)
(52) U.S. Cl. ..................... 359/704; 359/702; 359/823
(58) Field of Classification Search ................ 359/694, 359/695, 700–704, 819, 821, 822, 825, 826
See application file for complete search history.

(56) References Cited

U.S. PATENT DOCUMENTS 2,691,322 A * 10/1954 Wittel ........................ 359/825
5,144,493 A * 9/1992 Nomura ....................... 359/700
5,160,956 A * 11/1992 Watanabe et al. ........... 396/144

FOREIGN PATENT DOCUMENTS

JP  2000321474 A  11/2000
JP  20004085709 A  3/2004

* cited by examiner

*Primary Examiner*—Scott J. Sugarman
*Assistant Examiner*—M. Hasan
(74) *Attorney, Agent, or Firm*—Jacobson Holman PLLC

(57) ABSTRACT

A lens barrel with a lock arranged to avoid loosening the lock and defocusing the lens barrel when vibrated during focusing and zooming. The lens barrel includes a fixed cylinder, an adjustment ring, lock screws and a lock ring, lock screws and a lock ring. The adjustment ring is slidably attached to the fixed cylinder so as to rectify locations of optical components along the optical axis. The lock screws in screw holes extend at one end of the fixed cylinder in parallel with the optical axis, and each lock screw has a part that serves as a turning force transmitting segment and moves along the optical axis at the end of the fixed cylinder. The lock ring is slidably attached to the end of the fixed cylinder and has an inner surface that is mated with the force transmitting segment to let the lock screws rotate to secure the adjustment ring to the fixed barrel.

5 Claims, 8 Drawing Sheets

(a)

(b)

(c)

LENS BARREL WITH LOCK MECHANISM

FIELD OF THE INVENTION

The present invention relates to a lens barrel with a lock mechanism, and more particularly, it relates to a lens barrel with a lock mechanism capable of locking focusing and zooming adjustments so as to obviate adverse effects of vibration and the like on the adjusted focusing and zooming of a zoom lens for a monitor camera.

BACKGROUND ART

In the prior art lens barrel with a lock mechanism where the lens barrel includes several groups of lenses, an embodiment of the same has a feature that is a lens frame capable of fixedly holding at least one of the opposed endmost groups of lenses with fixing means applying force along the optical axis of the lens barrel while leaving the group of lenses adjustable in planes orthogonal to the optical axis (see Patent Document 1 listed below).

This arrangement has, as shown in FIG. 9, a lens frame 512 located at the endmost portion relative to the whole lens barrel when a group of lens 511 held in the lens holder 512 are used to adjust optics in the manner of parallel and eccentric adjustment. Hence, adjusting components can be set up in some simple way, and additionally, in practice, the operator is able to continually watch the lens frame 512 for more accurate parallel and eccentric adjustment of the optics through the lens frame 512.

Furthermore, a junction of the lens frame 512 with the focusing fixed lens barrel 514 is secured by fastening elements 517, with elastic elements 516 intervening therebetween, in a plurality of positions of bores in the orthogonal plane to the optical axis of the fixed barrel 514. In this way, the fastening elements 517 temporarily fitting those parts on each other cause the elastic element 516 to develop a constant load in the directions along the optical axis, and this obviates the effect of the gravity applied to the lens frame 512 to attain an accurate adjustment with an arbitrary amount of rectification.

After completing the adjustment, the fastening elements 517 are perpetually tightened till they keep themselves fixed in positions where resilience of the elastic element 516 no longer affects them, and thus, the lens frame 512 can be rigidly fixed relative to the focusing fixed lens barrel 514.

Another embodiment of the prior art lens barrel with a lock mechanism is that which eliminates a restriction on a rotation angle of a focusing ring but restricts a displacement of the focusing lens and associated elements for a unit rotation angle of the focusing ring to not so large an amount and which facilitates the focusing and is, after the focusing, capable of screwing lock screws down without causing defocus (e.g., see Patent Document 2).

A lens barrel 610 includes, as shown in FIG. 10, a fixed barrel 612, a focusing ring 614, and a focusing lens frame 616. A first cam groove 630 is defined inside the focusing ring 614. A first linear stud 632 is fixed to the focusing lens frame 616. A first longitudinal groove 634 is defined in the fixed barrel 612. A lock plate fastening pin (not shown) is used to fix a lock plate 670 to the focusing ring 614. When a lock screw 662 is screwed down, a tip 662b of the screw stalk forces the lock plate 670 to move till the lock plate 670 comes in contact with the outer surface of the fixed barrel 612.

List of Cited Documents

Patent Document 1 Japanese Patent Preliminary Publication No. 2000-321474
Patent Document 2 Japanese Patent Preliminary Publication No. 2004-85709

The lens barrel disclosed in Patent Document 1 permits the operator to continually watch the lenses while moving the lens frame 512 for the parallel and eccentric adjustment. Unlike the applicant's present invention, however, the prior art embodiment is unable to adjust and lock the lenses in the directions along the optical axis.

As to the lens barrel and the monitor camera disclosed in Patent Document 2, the lock screw is screwed down toward the center of the radial dimensions in the lens barrel, and this is prone to lead to a poor performance of the circumferential locking and to loosen the lock due to its pin-point abutment.

Also, since the lock member is tightened by means of the lock screw, fastening the lock member in its rotating direction urges the focusing ring to rotate as well to cause defocusing.

The lens barrel, when made of plastic, is to have its lock screws extending in radial directions for fixing the components, and this causes an outer diameter of the lens barrel to be altered. Further turning the screw down to tighten the coupling causes an inner diameter of the lens barrel to be altered as well, and this resultantly causes an adverse effect on the movement of the lens frame in its thrust directions. The total deformation of the lens barrel due to fastening the lock screws results in the group of lenses deviating in the directions along the optical axis, which, in turn, advertently give some effect upon performances of the optics.

Moreover, such pin-point abutment to the lens barrel is apt to loosen the locking in use under the condition of vibration, which also leads to the trouble of defocusing.

The present invention is made allowing for the above mentioned disadvantages in the prior art, and accordingly, it is an object of the present invention to provide a lens barrel with a lock mechanism which provides fixation to the lens barrel in not a single contact point but a plurality of contact points so as to effectively avoid loosening the locking in use of the lens barrel under the condition of vibration and which causes no adverse opt-mechanical effect upon the rotating members associated with the focusing and zooming adjustments during tightening the locking.

It is another object of the present invention to provide a lens barrel with a lock mechanism which enables a lock screw to be fastened without alteration in an outer diameter of the lens barrel and which avoids any adverse effect of the fastening of the lock screw on the movement of opt-mechanical components in thrust directions of the lens holder.

It is still another object of the present invention to provide a lens barrel with a lock mechanism which avoids deformation of the lens barrel as a result of fastening a lock screw and which also avoids deviation of a group of lenses in directions along the optical axis.

SUMMARY OF THE INVENTION

The present invention is directed to a lens barrel with a lock mechanism, and in one aspect of the present invention, the lens barrel comprises a fixed cylinder, an adjustment ring, a plurality of lock screws, and a lock operating ring.

The adjustment ring is slidably attached to the fixed cylinder so as to rectify locations of optical components in directions along the optical axis. The lock screws are fitted in a plurality of screw holes extending at one end or a first end of the fixed cylinder in parallel with the optical axis, and each of the lock screws has its part that serves as a turning force transmitting segment and moves in directions along the optical axis at the end of the fixed cylinder. The lock operating ring is slidably attached to the end of the fixed cylinder and has an inner engagement surface that is operatively mated with the turning force transmitting segment of the lock screw to let the lock screw rotate. The lock operating ring is rotated to turn the lock screw, and resultantly, the lock screw secures the adjustment ring to the fixed barrel to lock it up.

This invention is further featured as stated below.

The lock operating ring has a recession closer to the other end or a second end of the fixed cylinder so as not to be in contact with the turning force transmitting segment of each of the lock screws, and after a rotary movement of the lock operating ring permits the lock screws to fasten the adjustment ring down, a movement of the adjustment ring toward the first end of the fixed cylinder disconnects the lock screws from the lock operating ring.

The turning force transmitting segment of each of the lock screws and the inner engagement surface of the lock operating ring are wheel gears that has a rotation axis in parallel with the optical axis.

The turning force transmitting segment of each of the lock screws and the inner engagement surface of the lock operating ring are frictional rings that has a rotation axis in parallel with the optical axis.

The present invention is also directed to a monitoring apparatus that has a lens barrel with a lock mechanism built therein, and in another aspect of the present invention, the lens barrel comprises a fixed cylinder, an adjustment ring, a plurality of lock screws, and a lock operating ring.

The adjustment ring is slidably attached to the fixed cylinder so as to rectify locations of optical components in directions along the optical axis. The lock screws are fitted in a plurality of screw holes extending at one end or a first end of the fixed cylinder in parallel with the optical axis, and each of the lock screws has its part that serves as a turning force transmitting segment and moves in directions along the optical axis at the end of the fixed cylinder. The lock operating ring is slidably attached to the end of the fixed cylinder and has an inner engagement surface that is operatively mated with the turning force transmitting segment of the lock screw to let the lock screw rotate. The lock operating ring is rotated to turn the lock screw, and resultantly, the lock screw secures the adjustment ring to the fixed barrel to lock it up.

Thus, the lens barrel with the lock mechanism according to the present invention provides fixation to the lens barrel in not a single contact point but a plurality of contact points so as to effectively avoid loosening the locking in use of the lens barrel under the condition of vibration and which causes no adverse opt-mechanical effect upon the rotating members associated with the focusing and zooming adjustments during tightening the locking.

The lens barrel with the lock mechanism according to the present invention also enables a lock screw to be fastened without alteration in an outer diameter of the lens barrel and which avoids any adverse effect of the fastening of the lock screw on the movement of opt-mechanical components in thrust directions of the lens holder.

Moreover, the lens barrel with the lock mechanism according to the present invention avoids deformation of the lens barrel as a result of fastening a lock screw and which also avoids deviation of a group of lenses in directions along the optical axis.

BEST MODE OF THE INVENTION

Now described in detail below is the best mode of implementing a lens barrel with a lock mechanism according to the present invention, more particularly, such a lens barrel suitable to use in a monitoring apparatus.

EMBODIMENT 1

Figure 1:
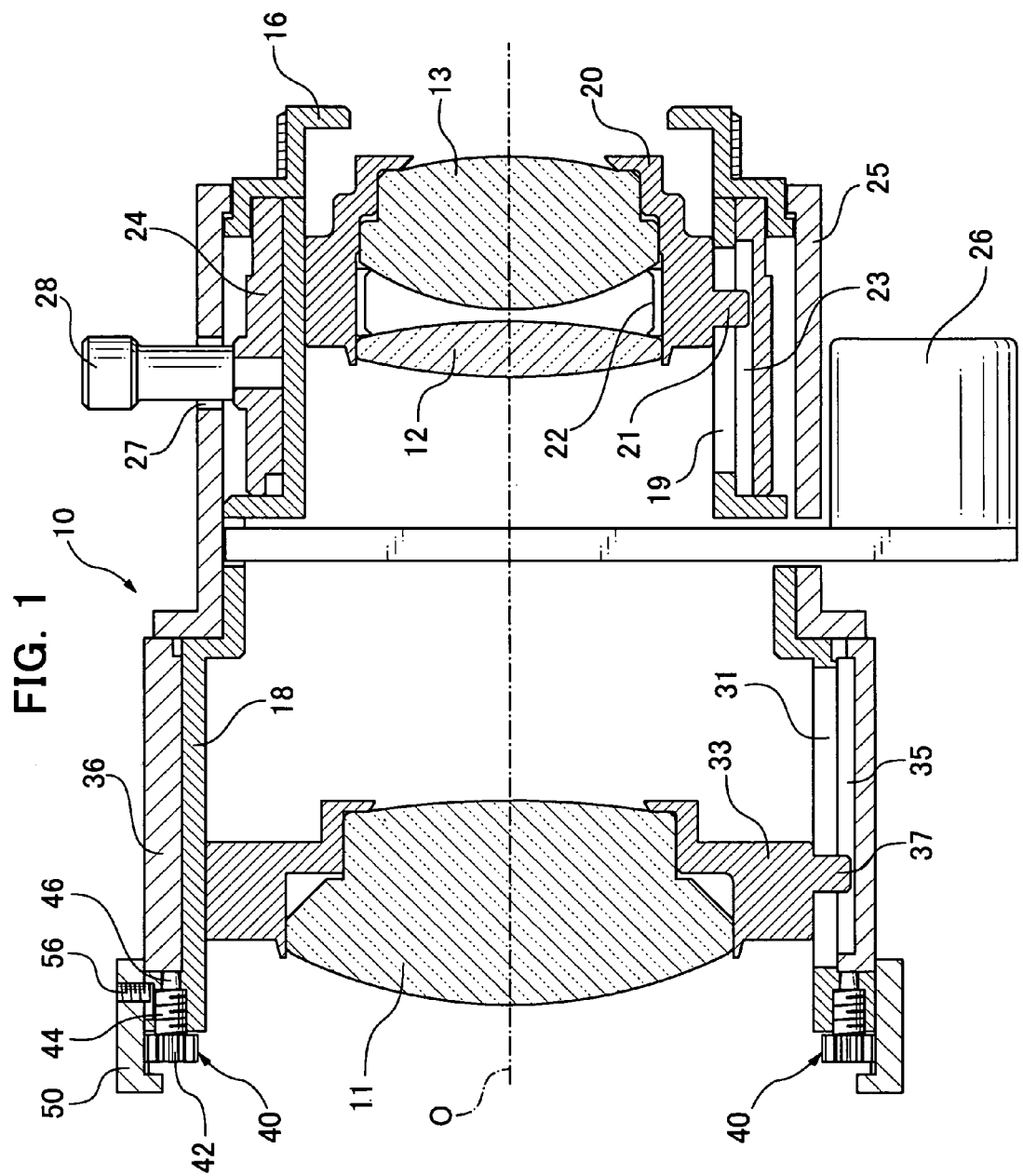
FIG. 1 is a sectional view illustrating a preferred embodiment of a lens barrel with a lock mechanism according to the present invention.

A preferred embodiment of the present invention, namely, a lens barrel 10 with a lock mechanism holds, as shown in FIG. 1, a first lens 11, a second lens 12, and a third lens 13, and further includes a lock mechanism dedicated only to the first lens 11. The lens barrel 10 with the lock mechanism has a fixed cylinder 18 integrally molded with a mount member 16. The fixed cylinder 18 is provided with a linear groove 19. Inside the fixed cylinder 18, a lens frame 20 is slidably mounted so as to hold the second and third lenses 12 and 13. The lens frame 20 has a zoom cam pin 21 that is adapted to fit in the linear groove 19 and a zoom cam groove 23 explained later. A separator ring 22 is interposed between the second and third lenses 12 and 13.

On the outer surface of the fixed cylinder 18 closer to the mount member 16, a zoom slider ring 24, which has the zoom cam groove 23 defined therein, slidably resides. Outside the zoom slider ring 24, a cover 25 is located at a certain distance from the same, a zoom operating pin 28 secured to the zoom slider ring 24 protrudes out of a slit 27 defined in the cover 25.

Right in front of the zoom slider ring 24 of the fixed cylinder 18, namely, closer to an object, a diaphragm unit 26 is provided.

Inside a distal end or a leading segment of the fixed cylinder 18 closer to the object, a linear groove 31 is defined. An inner surface of the leading segment of the fixed cylinder 18 has a lens frame 33 slidably attached to the same so as to hold the first lens 11 while an outer surface of the leading segment of the fixed cylinder 18 has a focus slider ring 36 with a focus cam 35 slidably attached thereto. The lens frame 33 has a focus cam pin 37 that is adapted to fit in the linear groove 31 and engage with the focus cam 35.

Figure 2:
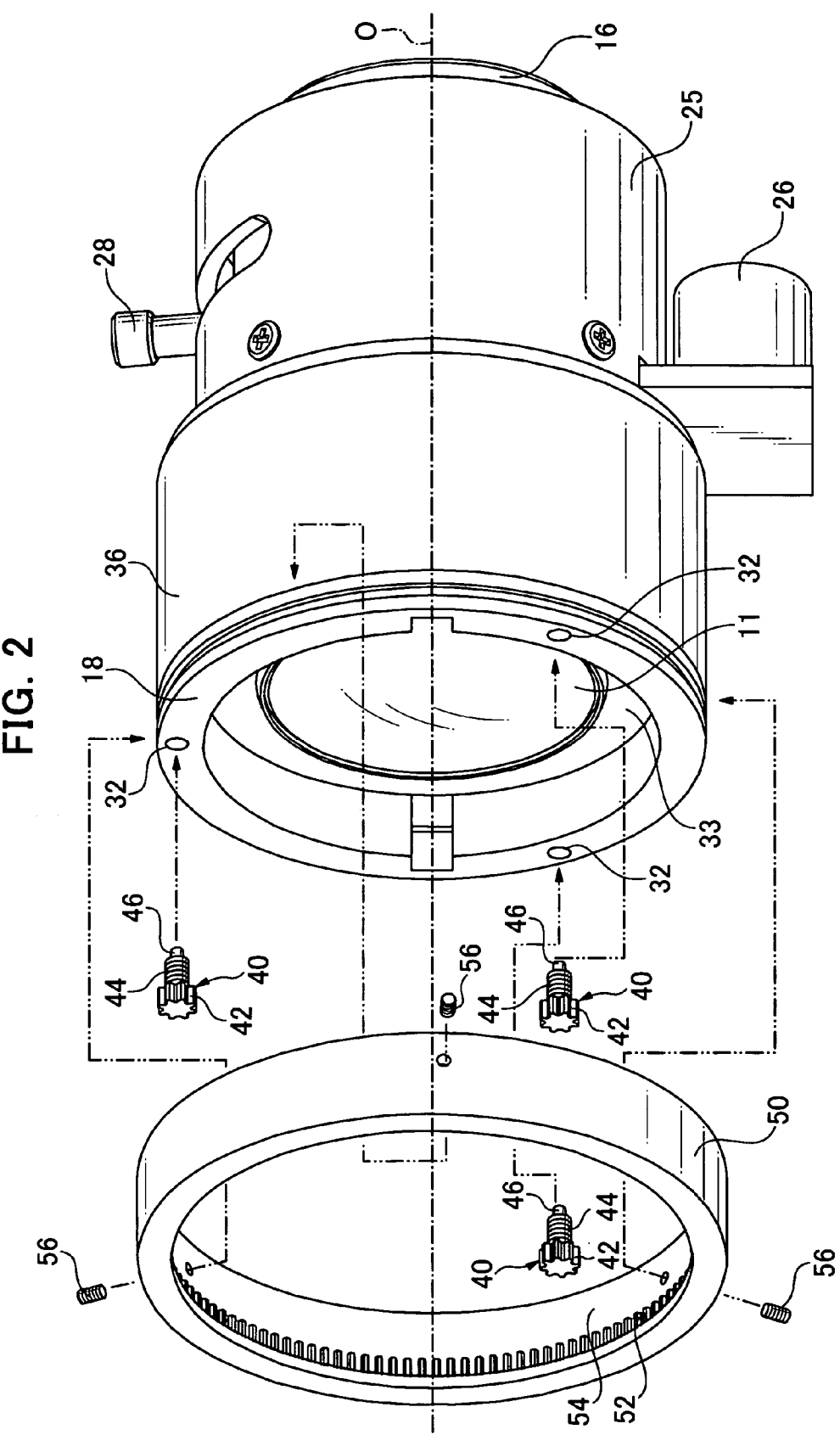
FIG. 2 is an exploded perspective view of the lens barrel with the lock mechanism according to the present invention.
Figure 3:
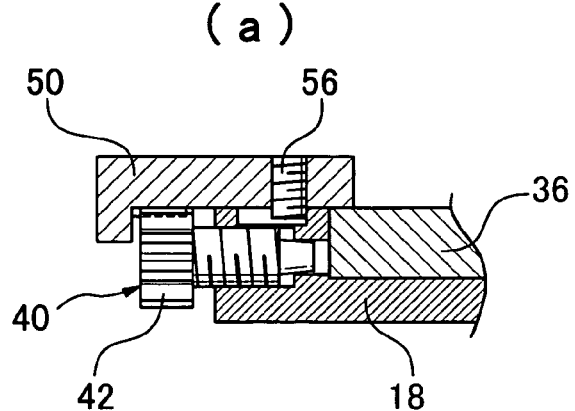
FIG. 3 is an enlarged view illustrating a practical operation of a lock screw and surrounding components of the lock mechanism.
Figure 3:
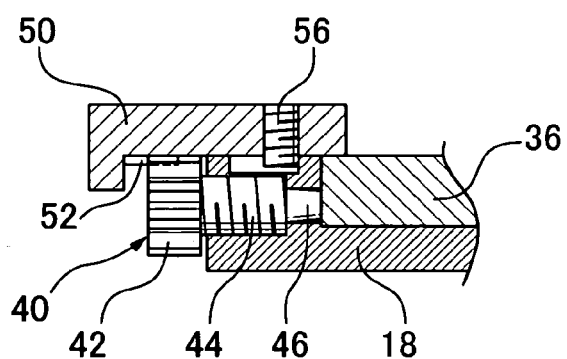
Figure 3:
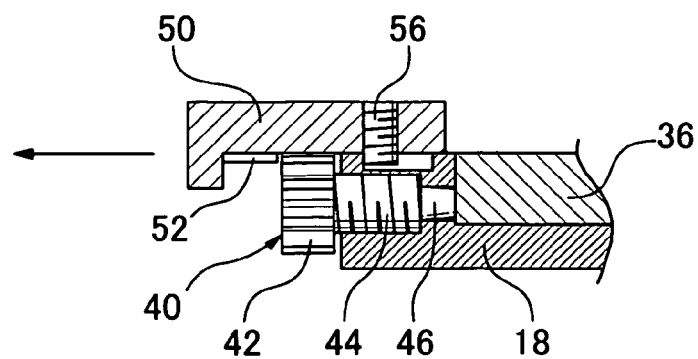

In the front end surface of the leading segment of the fixed cylinder 18, as can be seen in FIGS. 2 and 3, there are three of screw holes 32 defined at the same interval from each other, extending along the optical axis. The screw holes 32 are fitted on and mated with lock screws 40. Each of the lock screws 40 has a toothed leading gear head 42, a threaded intermediate stalk 44, and a trailing abutment tip 46, as illustrated in FIGS. 2 and 3, respectively.

Over the leading end of the fixed cylinder 18 fitted is a lock operating ring 50 having its inner surface toothed to serve as an internal wheel gear. As will be recognized in FIG. 3, the lock operating ring 50 with the internal wheel gear has lots of teeth 52 in its front inner surface so as to mesh with the leading gear head 42 of each of the lock screws 40, an annular recess 54 enlarging a diameter at its intermediate stalk, and three retaining screws 56 separated from each other at the same interval in its trailing portion.

The lens barrel 10 with the lock mechanism configured as mentioned above works as detailed below. During the zooming, the lens zoom operating pin 28 is pivoted about the optical axis to revolve the zoom slider ring 24. This permits the zoom cam pin 21 to move along the optical axis O, being fitted in the linear groove 19 and cam groove 23, which, in turn, enables the second and third lenses 12 and 13 to move along the optical axis O for the zooming in a predetermined manner.

For the focusing, the focus slider ring 36 is rotated about the optical axis O. This permits the focus cam pin 37 to move along the optical axis O, being fitted in the linear groove 31 and engaged with the focus cam 35, thereby attaining the focusing in a predetermined manner.

Figure 4:
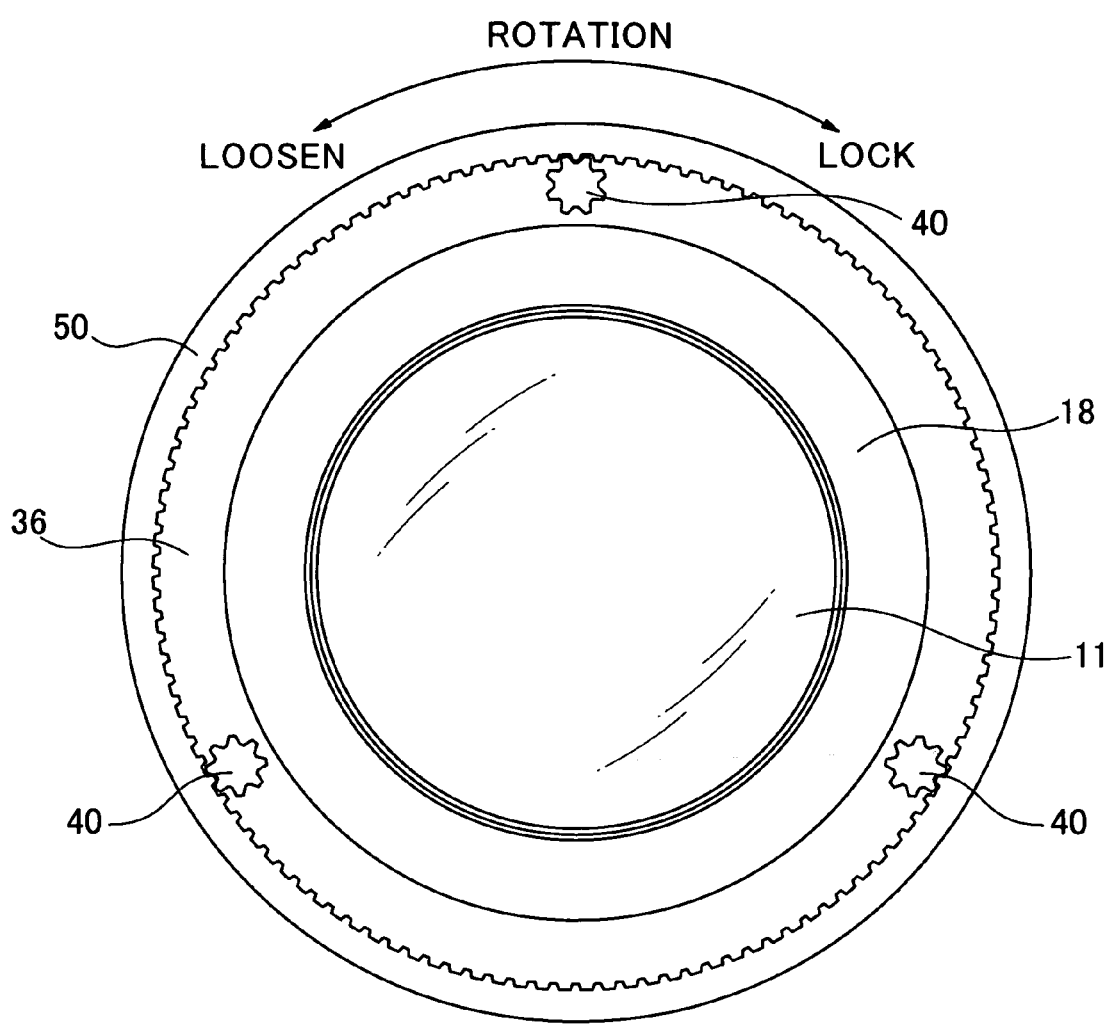
FIG. 4 is a diagram of the lock mechanism that is depicted on the side of an object, facing the lens barrel.

Next, features of the lock mechanism for the lens barrel 10 will be described. As can be seen in FIG. 3(a) and FIG. 4, the lock operating ring toothed inside to work as the internal wheel gear is revolved about the optical axis O in the clockwise direction as seen from the object, so as to turn the lock screws in the clockwise direction. This forces the abutment point 46 of each lock screw 40 to push the focus operating ring 36, which allows for the focus operating ring 36 to be locked up by the lock screw 40, as shown in FIG. 3(b). Subsequent to this, as in FIG. 3(c), as the lock operating ring 50 with the internal wheel gear is pulled forward, the internal teeth 52 of the lock operating ring 50 is disengaged from the toothed gear head 42 of each lock screw 40. Simultaneously, the fixed cylinder 18 and the retaining screws 56 are engaged with each other, and hence, the lock operating ring 50 with the internal wheel gear will not be released from the fixed cylinder 18 any longer.

Also, since the internal teeth 52 of the lock operating ring 50 keep disengaged from the gear head 42, some inadvertent action of touching and moving the lock operating ring 50 will not loosen the lock, and the perfect locking can be retained.

EMBODIMENT 2

Figure 5:
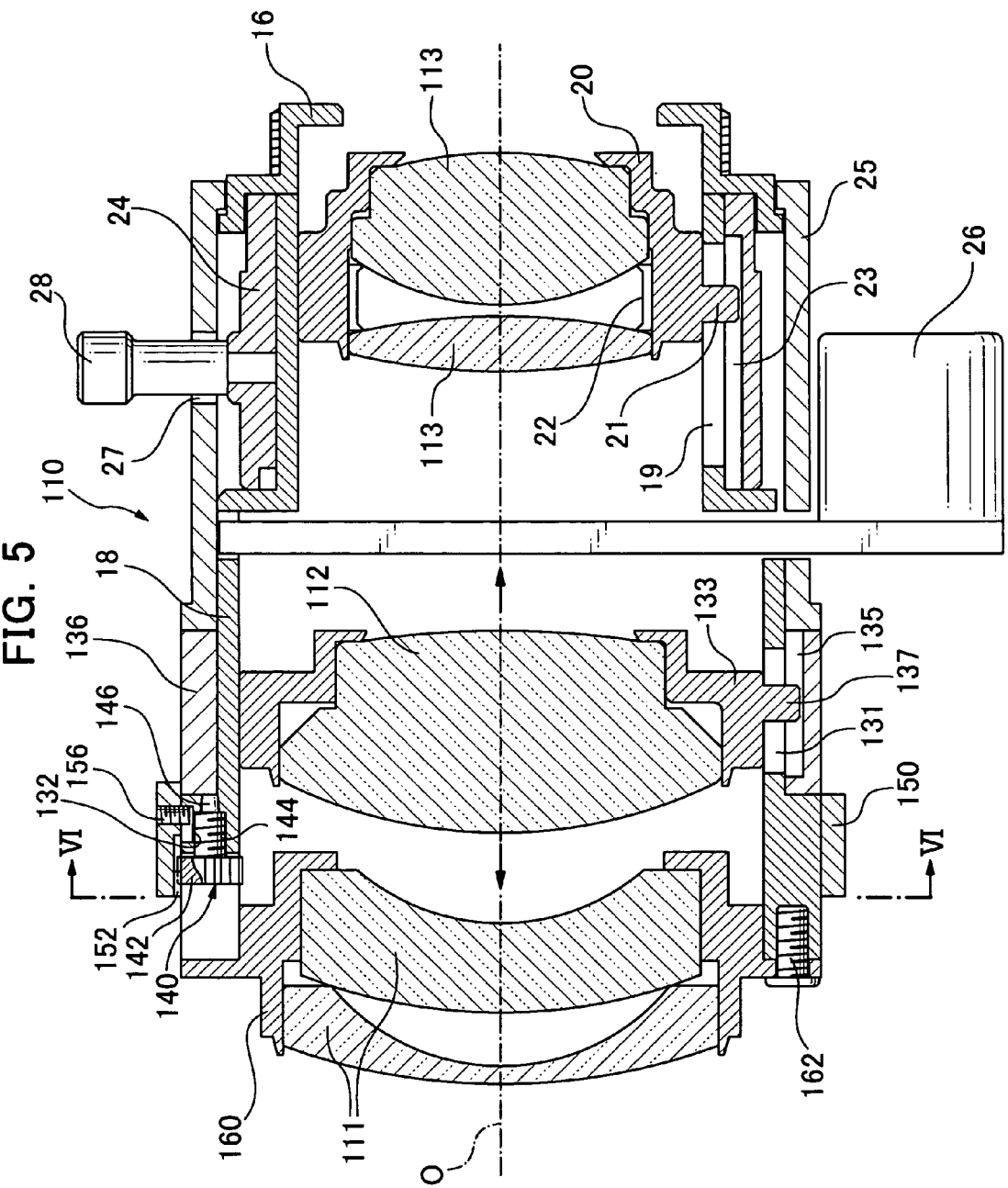
FIG. 5 is a sectional view illustrating another preferred embodiment of the lens barrel with the lock mechanism according to the present invention.
Figure 7:
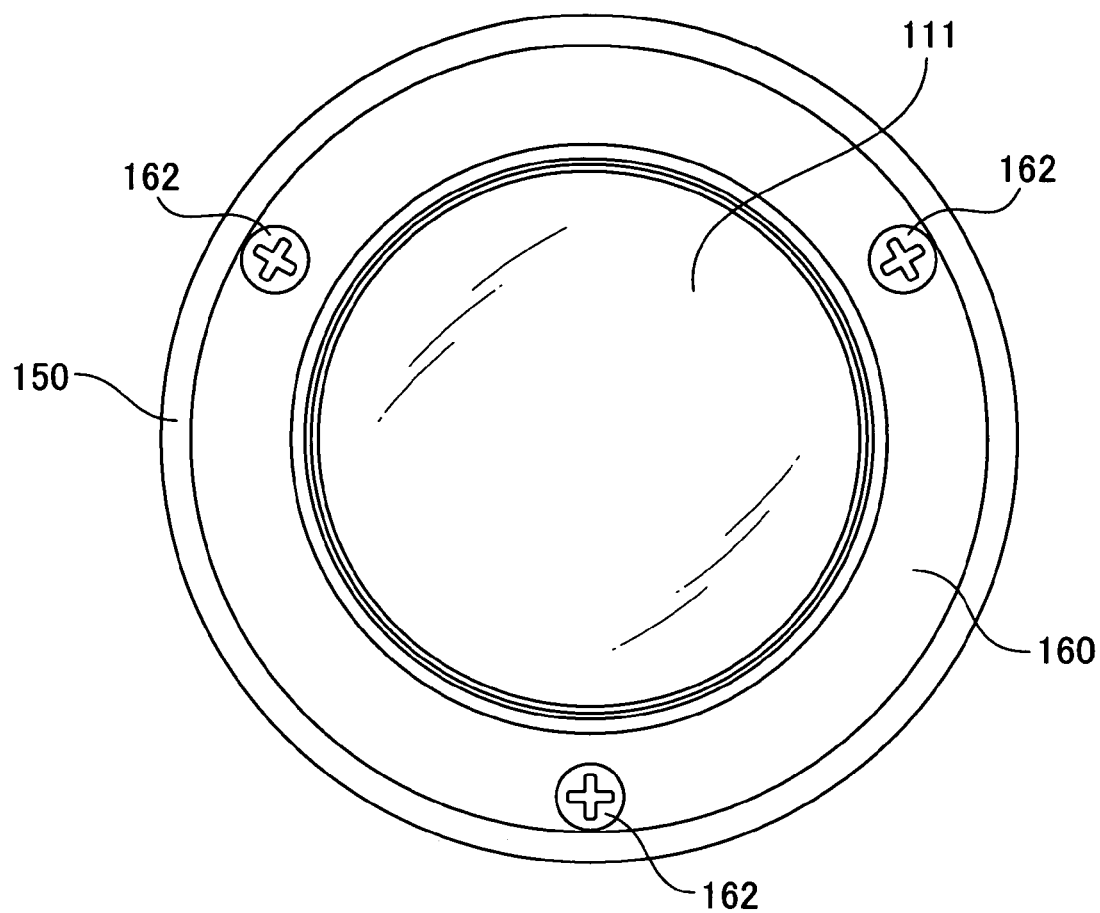
FIG. 7 is a front view illustrating the lens barrel with the lock mechanism.
Figure 8:
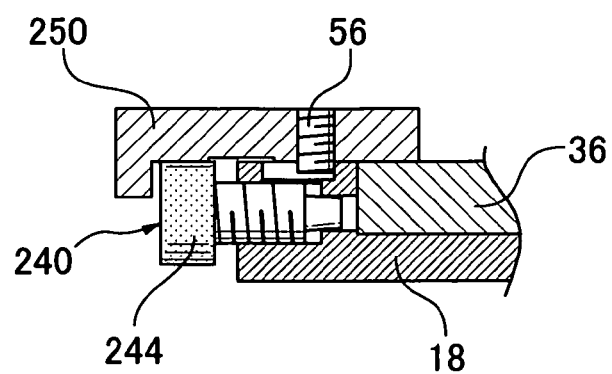
FIG. 8 is an enlarged view illustrating still another embodiment of the lens barrel with the lock mechanism according to the present invention.
Figure 9:
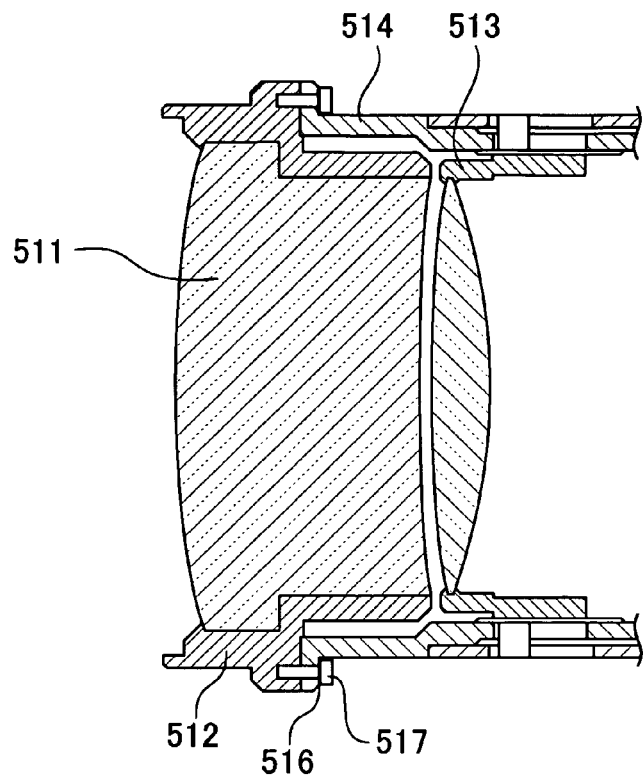
FIG. 9 is a sectional view of a lens barrel as disclosed in Patent Document 1 listed above.
Figure 10:
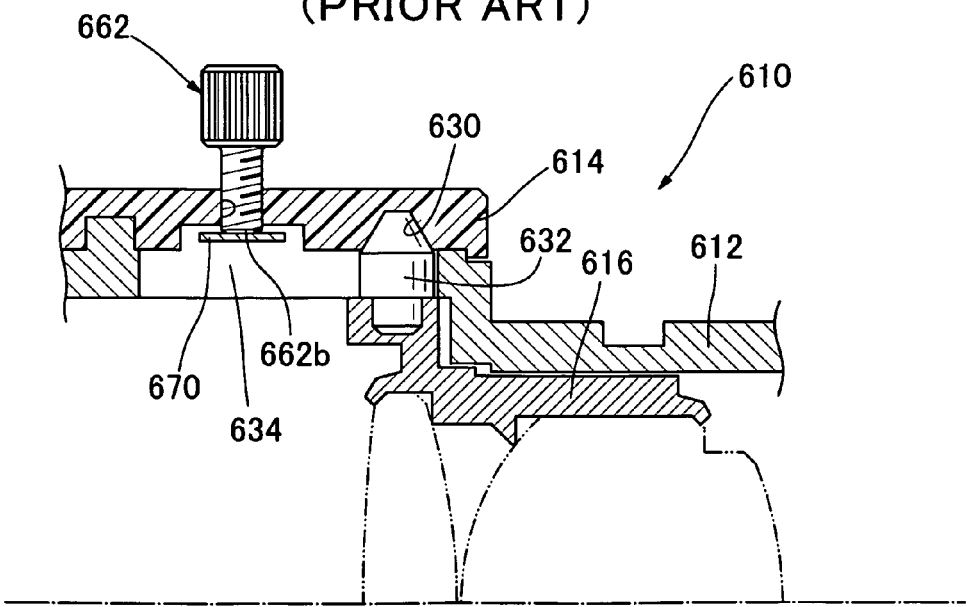
FIG. 10 is a sectional view of a lens barrel as disclosed in Patent Document 2.

Another embodiment of the invention, namely, a lens barrel 110 with a lock mechanism is depicted in FIGS. 5 and 7 where substantially the same components as those in the aforementioned embodiment are denoted by identical reference numerals, and explanations about them are omitted.

The lens barrel 110 with a lock mechanism in this embodiment includes a first group of lenses 111, a second lens, and a third group of lenses 113, and further includes a lock mechanism dedicated to the second lens 112.

Inside an intermediate portion of a distal end or a leading segment of the fixed cylinder 18 closer to the object, a linear groove 131 is defined. An inner surface of the leading segment of the fixed cylinder 18 has a lens frame 133 slidably attached to the same so as to hold the second lens 112 while an outer surface of the leading segment of the fixed cylinder 18 has an adjustment slider ring 136 with an adjustment cam 135 slidably attached thereto. The lens frame 133 has a focus cam pin 137 that is adapted to fit in the linear groove 131 and engage with the adjustment cam 135.

Figure 6:
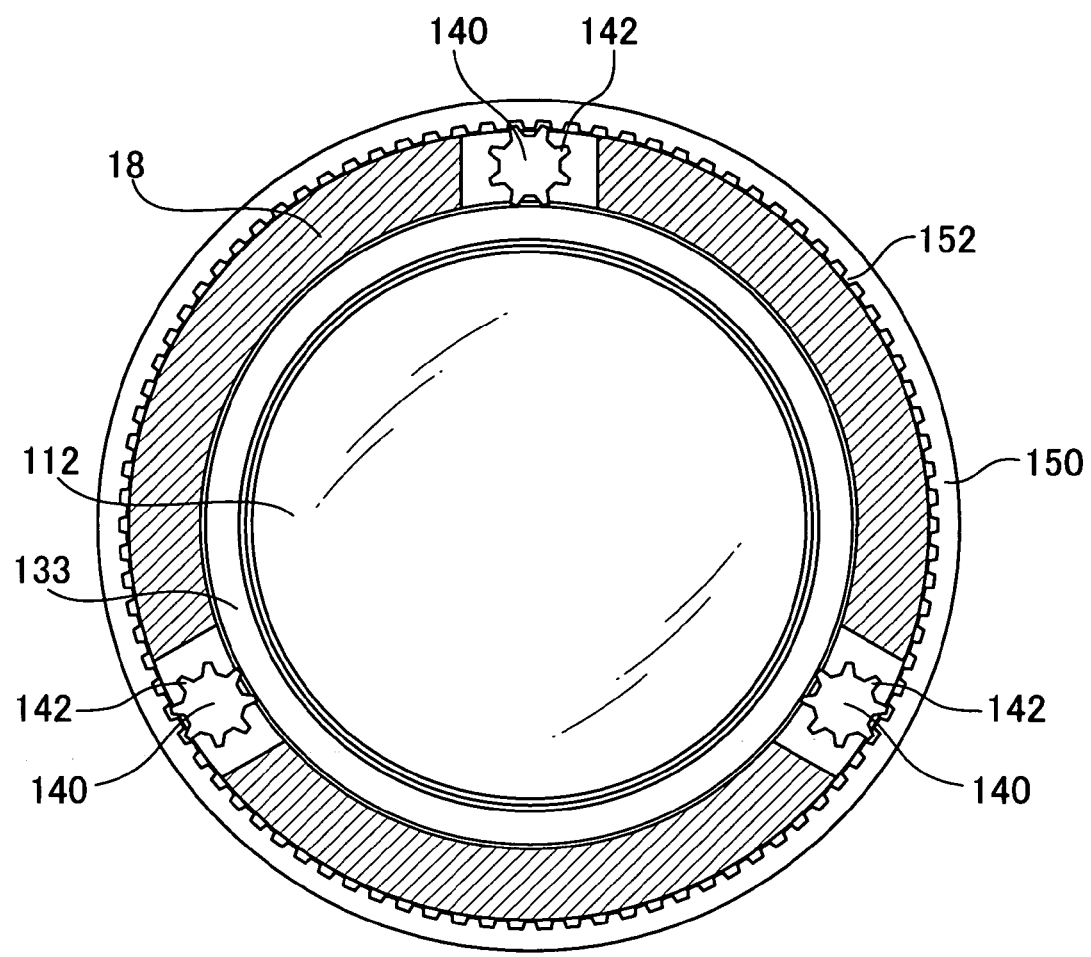
FIG. 6 is a sectional view taken along the line VI—VI in FIG. 5.

In the intermediate portion of the leading segment of the fixed cylinder 18, as can be seen in FIGS. 5 and 6, there are three of screw holes 132 defined at the same interval from each other, extending along the optical axis. The screw holes 132 are fitted on and mated with lock screws 140. Each of the lock screws 140 has a toothed leading gear head 142, a threaded intermediate stalk 144, and a trailing abutment tip 146.

Over an outer surface in the intermediate portion of the leading segment of the fixed cylinder 18 fitted is a lock operating ring 150 having its inner surface toothed to serve as an internal wheel gear. The lock operating ring 150 with the internal wheel gear has lots of teeth 152 in its inner surface so as to mesh with the leading gear head 142 of each of the lock screws 140, and three retaining screws 156 separated from each other at the same interval in its trailing portion. At a distal end of the fixed cylinder 18, as illustrated in FIG. 7, a lens frame 160 is secured by a retaining screw 162 so as to hold the first group of lenses 111.

Features of the lock mechanism for the lens barrel 110 will now be described. The lock operating ring 150 with the internal wheel gear is revolved about the optical axis O in the clockwise direction as seen from the object, so as to turn the lock screws 140 in the clockwise direction. This forces the abutment point 146 of each lock screw 140 to push the adjustment operating ring 136, which allows for the adjustment operating ring 136 to be locked up by the lock screw 140.

Subsequent to this, as the lock operating ring 50 with the internal wheel gear is pulled forward, the internal teeth 152 of the lock operating ring 150 is disengaged from the toothed gear head 142 of each lock screw 140. Simultaneously, the fixed cylinder 18 and the retaining screws 156 are engaged with each other, and hence, the lock operating ring 150 with the internal wheel gear will not be released from the fixed cylinder 18 any longer.

Also, since the internal teeth 152 of the lock operating ring 150 keep disengaged from the gear head 142, some inadvertent action of touching and moving the lock operating ring 150 will not loosen the lock, and the perfect locking can be retained.

EMBODIMENT 3

Still another embodiment of the present invention, namely, a lens barrel with a lock mechanism has several components which are substitutions for those in the lens barrel in the aforementioned embodiment presented first herein; for example, it includes a frictional lock operating ring 250 for the lock operating ring 50 with the internal wheel gear, and frictional lock screws 240 for the lock screws 40. The frictional lock operating ring 250 has its inner surface frictionally engaged with a frictional engagement segment 244 of a material such as a rubber that is located around a leading head of each of the frictional lock screws 240.

As has been described above, the lens barrel with the lock mechanism according to the present invention can be used to adjust and/or lock in directions along the optical axis a lens(es), a filter, and other optical components which are located in lateral sides of the optics closer to an object or closer to an attachment/detachment mount where the optics are not limited to a focusing lens and a zoom lens but any of these kinds.

What is claimed is:

1. A lens barrel with a lock mechanism, comprising
a fixed cylinder,
an adjustment ring slidably attached to the fixed cylinder for rectifying locations of optical components in directions along the optical axis,
a plurality of lock screws fitted in a plurality of screw holes extending at one end of the fixed cylinder in parallel with the optical axis, the lock screws each having its part serving as a turning force transmitting segment and moving in directions along the optical axis at the end of the fixed cylinder, and
a lock operating ring slidably attached to the end of the fixed cylinder and having an inner engagement surface, the inner engagement surface being operatively mated with the turning force transmitting segment of the lock screw to let the lock screw rotate, the lock operating ring being pivoted to turn the lock screw, and the lock screw securing the adjustment ring to the fixed barrel to lock it up.

2. A lens barrel with a lock mechanism according to claim 1, wherein thee lock operating ring has a recession closer to the other end or a second end of the fixed cylinder so as not to be in contact with the turning force transmitting segment of each of the lock screws, and after a rotary movement of the lock operating ring permits the lock screws to fasten the adjustment ring down, a movement of the adjustment ring toward the first end of the fixed cylinder disconnects the lock screws from the lock operating ring.

3. A lens barrel with a lock mechanism according to claim 1, wherein the turning force transmitting segment of each of the lock screws and the inner engagement surface of the lock operating ring are wheel gears that has a rotation axis in parallel with the optical axis.

4. A lens barrel with a lock mechanism according to claim 1, wherein the turning force transmitting segment of each of the lock screws and the inner engagement surface of the lock operating ring are frictional rings that has a rotation axis in parallel with the optical axis.

5. A monitoring apparatus that has a lens barrel with a lock mechanism built therein, and the lens barrel being as defined in claim 1.

* * * * *